United States Patent [19]

Kataoka

[11] Patent Number: 5,271,576
[45] Date of Patent: Dec. 21, 1993

[54] PHOTOGRAPHIC FILM CASSETTE WITH DUST COLLECTING RIDGES

[75] Inventor: Hideaki Kataoka, Kanagawa, Japan

[73] Assignee: Fuji Photo Film Co., Ltd., Kanagawa, Japan

[21] Appl. No.: 813,924

[22] Filed: Dec. 27, 1991

[30] Foreign Application Priority Data

Dec. 28, 1990 [JP] Japan ................... 2-416491

[51] Int. Cl.⁵ ........................................... G03B 17/26
[52] U.S. Cl. ................................... 242/71.1; 354/275
[58] Field of Search ................. 242/71, 71.1, 71.8; 354/275, 277

[56] References Cited

U.S. PATENT DOCUMENTS

| | | | |
|---|---|---|---|
| 1,159,732 | 11/1915 | Akeley | 242/71.1 |
| 1,987,247 | 1/1935 | Schnitzler | 242/71.1 |
| 2,153,573 | 4/1939 | Kinloch | 242/71.1 |
| 2,336,278 | 12/1943 | Mihalyi | 242/71.1 |
| 2,360,255 | 10/1944 | Mihalyi | 242/71.5 |
| 2,364,381 | 12/1944 | Mihalyi | 242/71 |
| 2,521,935 | 9/1950 | Monroe | |
| 2,552,200 | 5/1951 | Mihalyi | 242/71.1 |
| 3,384,318 | 5/1968 | Nerwin et al. | 242/71.1 |
| 3,467,340 | 9/1969 | Rosenburgh | 242/197 |
| 3,556,435 | 1/1971 | Wangerin | 242/210 |
| 3,627,229 | 12/1971 | Wangerin | 242/71.8 |
| 3,627,230 | 12/1971 | Wangerin | 242/71.8 |
| 3,677,499 | 7/1972 | Wangerin | 242/210 |
| 3,797,777 | 3/1974 | Hosono et al. | 242/71.8 |
| 4,834,306 | 5/1989 | Robertson et al. | 242/71.1 |
| 4,846,418 | 7/1989 | Fairman | 242/71.1 |
| 4,875,637 | 10/1989 | Beach | 354/275 X |
| 4,883,235 | 11/1989 | Niedospial, Jr. | 242/71.1 |
| 4,883,236 | 11/1989 | Niedospial, Jr. et al. | 242/71.1 |
| 4,962,401 | 10/1990 | Takahashi | 242/71.1 |
| 5,003,334 | 3/1991 | Pagano et al. | 354/275 |
| 5,106,030 | 4/1992 | Pagano et al. | 354/275 X |

FOREIGN PATENT DOCUMENTS

| | | |
|---|---|---|
| 2921379 | 11/1980 | Fed. Rep. of Germany . |
| 3193142 | 8/1988 | Japan ................... 242/71 |
| 1-306844 | 12/1989 | Japan . |
| 1-306845 | 12/1989 | Japan . |

Primary Examiner—Daniel P. Stodola
Assistant Examiner—Eileen Dunn
Attorney, Agent, or Firm—Sughrue, Mion, Zinn, Macpeak & Seas

[57] ABSTRACT

A plurality of grooves are formed on upper and lower inside surfaces of a film passageway of a cassette shell. The grooves receive dust tending to adhere to the photographic film, and prevent the dust from entering a film chamber of the cassette shell in order to protect surfaces of photographic film from scratches.

17 Claims, 3 Drawing Sheets

PHOTOGRAPHIC FILM CASSETTE WITH DUST COLLECTING RIDGES

BACKGROUND OF THE INVENTION

1. Field of the Invention

The present invention relates to a photographic film cassette, more particularly to a film cassette in which scratches on the photographic film due to dust, or the like, is prevented.

2. Description of the Related Art

It is known to utilize a 35 mm film cassette having a film leader which does not protrude from the cassette shell prior to loading, and which is thus easily loaded in a camera. Such a device is disclosed in Japanese Patent Laid-open Publications Nos. 1-306844 and 1-306845. Rotation of a spool, by a mechanism in the camera, in the direction of unwinding the photographic film, causes the film leader to advance to the outside of the cassette shell through a film passage mouth. The cassette shell is provided with a device for preventing the roll of film from loosening when the spool is rotated. Accordingly, the rotary force of the spool is transmitted to the film leader.

In such a leader-propelling type film cassette, the cassette shell is molded from plastics or the like, as it has a complicated structure. The photographic film is then likely to be scratched by roughness on the surface of the plastic. When the photographic film exposed in the camera, dust, dirt, or the like, situated in the camera, might adhere to the photographic film and thus be drawn into the cassette shell with the photographic film upon rewinding.

When the exposed photographic film is propelled for the purpose of development, the film leader abuts on and is separated by a separating claw formed in the cassette shell. It is often necessary to rotate the roll of film a plurality of times in the cassette shell before completely separating the film leader. Therefore, a rather large amount of motion of the photographic film within the cassette shell is required as compared to a cassette shell of a conventional film cassette. When dust is situated between film surfaces and the inside surfaces of the cassette shell scratches often are formed on the film surfaces.

SUMMARY OF THE INVENTION

It is therefore an object of the present invention to provide a photographic film cassette in which dust is prevented from scratching the surfaces of the photographic film.

In order to achieve the above and other objects and advantages of this invention, a plurality of recesses are formed on upper and lower inside surfaces of a film passageway so as to receive dust adhering to the photographic film and prevent the dust from entering a film chamber of the cassette shell.

Recesses are also formed in the film chamber for receiving dust even when it has entered the film chamber, so that the film surfaces are reliably protected from scratches.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
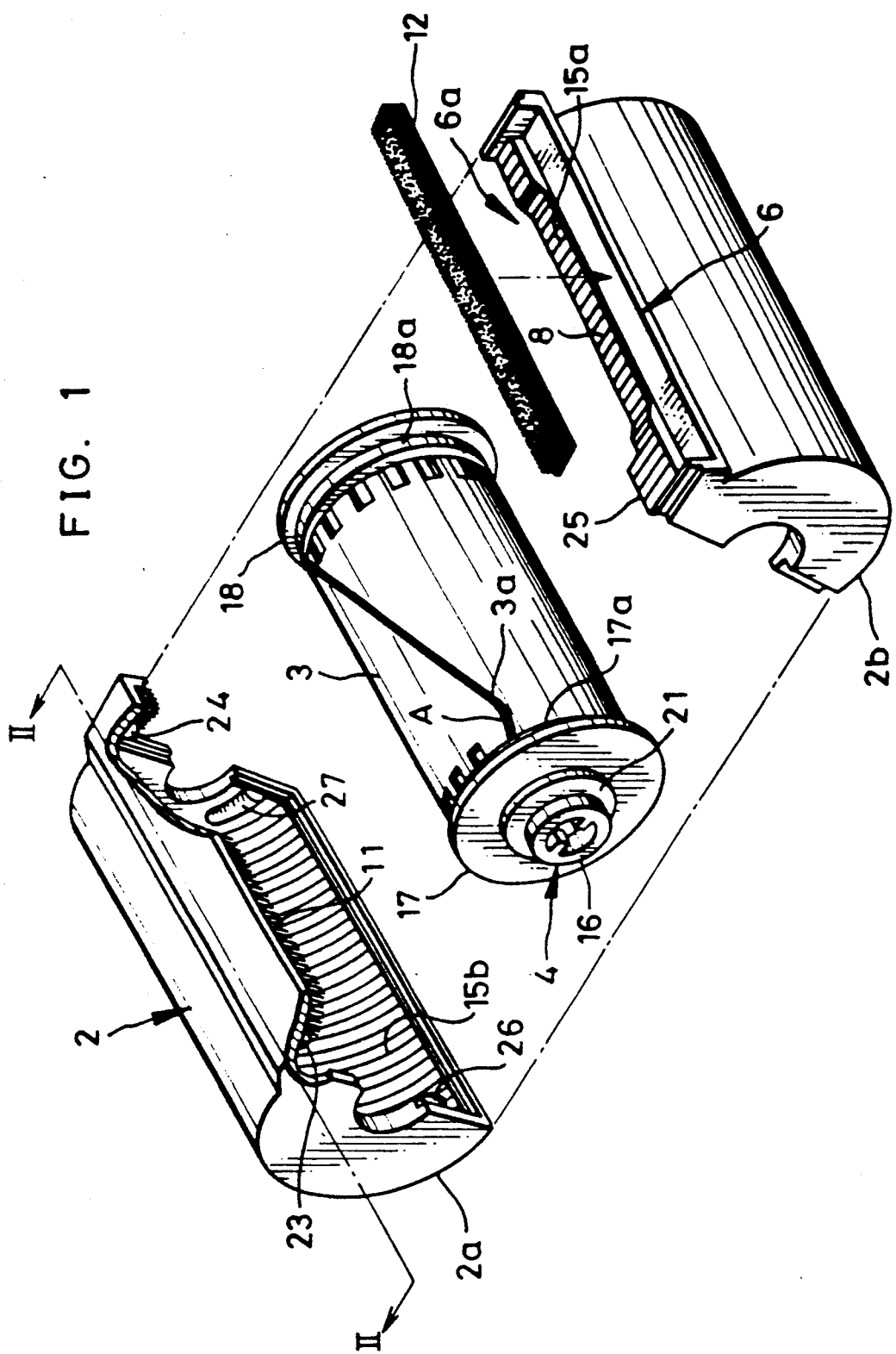
FIG. 1 is an exploded perspective view illustrating a photographic film cassette in accordance with a first preferred embodiment of the present invention.

FIG. 1 illustrates a first preferred embodiment of the present invention. A photographic film cassette consists of a cassette shell 2 and a spool 4, having photographic film 3 wound in a roll thereon, rotatably contained in the cassette shell 2. The cassette shell 2 consists of two shell halves 2a and 2b, and is molded from light-shielding plastic resin, or the like, e.g. high-impact polystyrene (HIPS) with carbon black added at 0.5%.

A film passage mouth 6 is formed between the shell halves 2a and 2b for passage of a film leader 3a therethrough. The film passageway 6a communicates with the film passage mouth 6 and a film chamber of the cassette shell 2 where the photographic film is contained. Upper and lower inside surfaces 7 and 8 of the film passageway 6a are provided with plush or light-trapping members 11 and 12 for preventing light from entering the cassette shell 2.

Figure 2:
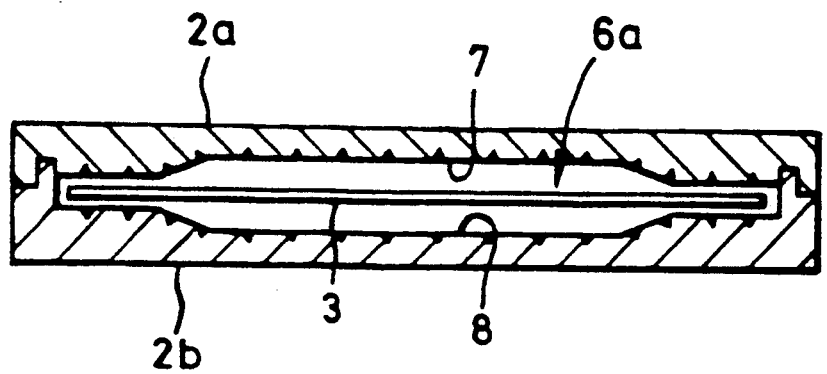
FIG. 2 is a sectional view illustrating a film passageway of the preferred embodiment, taken on line II—II in FIG. 1.

FIG. 2 illustrates the film passageway 6a in cross section. The interval across the film passageway 6a is larger at the center corrsponding to image frames on the photographic film 3, and smaller at the lateral end portion corresponding to the outside of the image frames. The lateral end portions of the inside surfaces 7 and 8 are preferably in contact with the photographic film 3 so as to exert a small force due to pressure therebetween.

Figure 3:
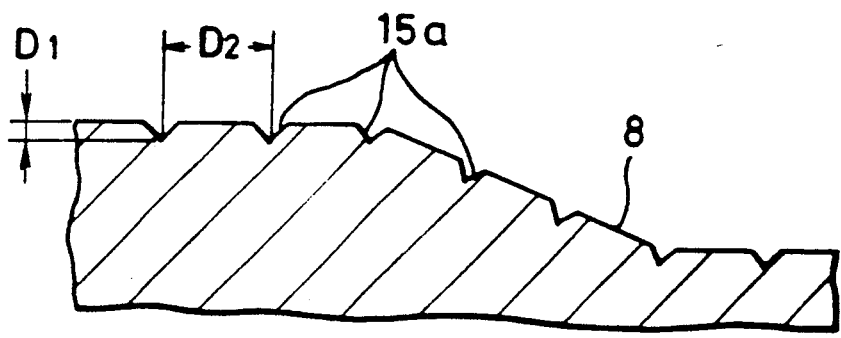
FIG. 3 is an enlarged sectional view illustrating an important portion illustrated in FIG. 2.

A plurality of grooves 15a are formed on the inside surfaces 7 and 8 at a position interior to the light-trapping members 11 and 12 (see FIG. 3). Inner grooves 15b are formed on the inside of the shell halves 2a and 2b so as to communicate with the grooves 15a (See FIG. 1). The grooves 15a and 15b protect the surfaces of the photographic film 3 from scratches by receiving fine dust stuck to the film surfaces. The grooves 15a and 15b have a width $D_1$ of e.g. 0.1 mm and an interval $D_2$ therebetween of e.g. 0.6 mm as illustrated in FIG. 3.

A pair of spool flanges, or disks, 17 and 18 molded from flexible plastic, or the like are loosely fitted on a spool core 16 of the spool 4. Rings or washers 21 and 22 for preventing light from entering the spaces between the spool core 16 and the bearing holes of the cassette shell 2 are fitted on the spool core 16 on the outside of the spool flanges 17 and 18.

Circumferential lips 17a and 18a project from the inside of the spool flanges 17 and 18, respectively, toward the opposite flanges for contact with the outermost turn of the roll of the photographic film 3 at lateral edges thereof, in order to prevent the roll of film 3 from loosening. The outer diameter of the circumferential lips 17a and 18a is preferably smaller than the diameter of the circumferences of the spool flanges 17 and 18. In other words, the circumferential edges of the spool flanges 17 and 18 project from the root portions of the circumferential lips.

Triangular guide projections 23 and 24 are formed on the upper shell half 2a, at a position inside film passageway 6a, for contact with the inside surfaces of the peripheral edges of the disks 17 and 18 in order to deform portions of the peripheral edges, proximate the film passageway 6a, outward in the widthwise direction of the photographic film 3 so as to release the photographic film 3 from the circumferential lips 17a and 18a.

One leader-separating tapered end 25 is formed on the lower shell half 2b for separating a leading end A cut in an oblique fashion of the film leader 3a from surface of the inner roll of the photographic film 3 so as to guide the leading end A to the film passage mouth 6. The tapered end 25 occupies a lateral portion of the film passageway 6a in correspondence with a range from a lateral edge of the photographic film 3 to a position slightly exterior to image frames on the photographic film 3, so that pressure in contact between the film surfaces and the inside surfaces 7 and 8 is minimized.

When loading a camera with the film cassette of the first preferred embodiment, the spool core 16 is rotated in the film unwinding direction by a film initial advance mechanism of the camera. Although the photographic film 3 is subjected to rotation in the unwinding direction, the disks 17 and 18 are prevented, by arcuate ridges 26 and 27, from spreading outward except at portions thereof in the vicinity of a film entrance defined between the film passageway 6a and the film chamber. The circumferential lips 17a and 18a are in contact with both lateral edges of the outermost turn of the photographic film 3 so as to prevent the photographic film 3 from loosening further. The rotation of the spool core 16 is thus transmitted to the film leader 3a. The film leader 3a is rotated reliably together with the roll of the photographic film 3 in the unwinding direction.

Because the ridges 26 and 27 do not reach the vicinity of the film entrance of the film passageway 6a, and because the guide projections 23 and 24 bend the peripheral edges of the disks 17 and 18 outward, both lateral edges of the photographic film 3 are released from pressure of the circumferential lips 17a and 18a. When the spool core 16 is rotated further, the film leader 3a, separated from the roll of the photographic film 3 by the tapered end 25, passes the tapered end 25 along its upper surface, and is guided to the film passageway 6a.

The area on the photographic film 3 having image frames is free from contact with the inside surfaces 7 and 8 of the film passageway 6a. The edge portions of the photographic film 3 are in contact with both inside surfaces 7 and 8 while the photographic film 3 is advanced to the film passage mouth 6 and exits the cassette shell 2. When all the image frames have been recorded on the photographic film 3 by the camera, the spool core 16 is rotated in the film wind-up direction so as to rewind up the exposed film into the cassette shell 2. Dust in the camera, particularly stiff and sharp particles, tending to adhere to the photographic film 3, is trapped in the grooves 15a formed on the inside surfaces 7 and 8 of the film passageway 6a, and thus does not enter the film chamber. Any extra dust which has failed to be trapped in the film passageway 6a is trapped in the grooves 15b of the shell halves 2a and 2b. The inner grooves 15b thus perform an auxiliary dust removal function.

The film cassette after exposure is forwarded to a photolaboratory for processing. An operator of the photolaboratory rotates the spool core 16 to propel the film leader 3a out of the cassette. Before the film leader 3a is captured by the tapered end 25, the roll of film 3 may make a number of idle rotations. As there is little dust in the film chamber, the photographic film 3 does not become scratched during the idle rotations and the advance of the film leader. Scratching of the photographic film 3 is further avoided because dust is trapped in the grooves 15a during passage of the exposed film in the film passageway 6a.

It is noted that plastic particles, or the like, may be left in the film chamber during manufacturing of the film cassette and adhere to the unexposed film 3. Such particles are also received in the grooves 15a formed on the inside surfaces 7 and 8 and the grooves 15b of the film chamber of the cassette shell 2. Accordingly, the film surfaces are not scratched by such particles.

Figure 4:
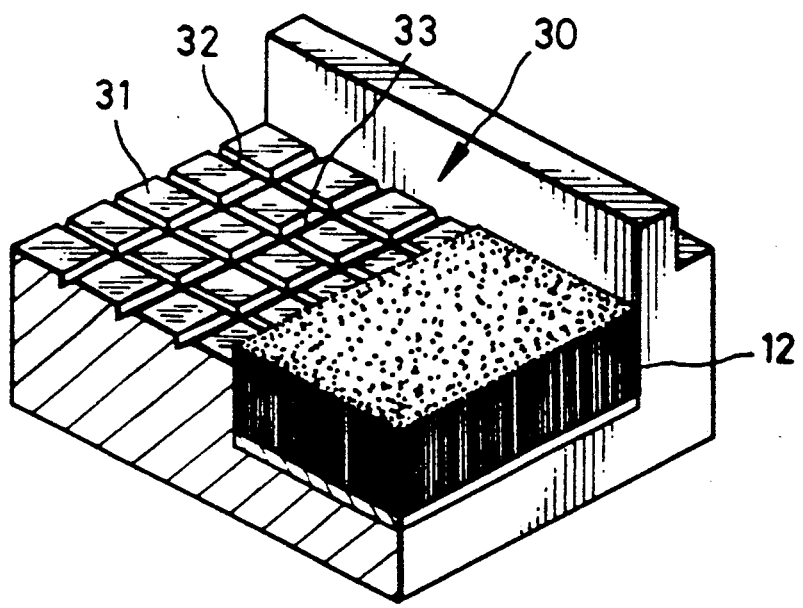
FIGS. 4, 5 and 6 are perspective views, partially broken, illustrating film passageways of film cassettes in accordance with a second, third and fourth preferred embodiment respectively.

Other preferred embodiments of the present invention are described with reference to FIGS. 4 to 6. A film passageway 30 of the second preferred embodiment, as illustrated in FIG. 4, has inside surfaces 31, in which grooves 33 are formed so as to run at right angles to grooves 32 along the direction of advancing the photographic film. The grooves 32 and 33 form a grid layout for trapping dust. It is noted that, of the two surfaces 31, only the lower inside surface is shown in the drawing.

Figure 5:
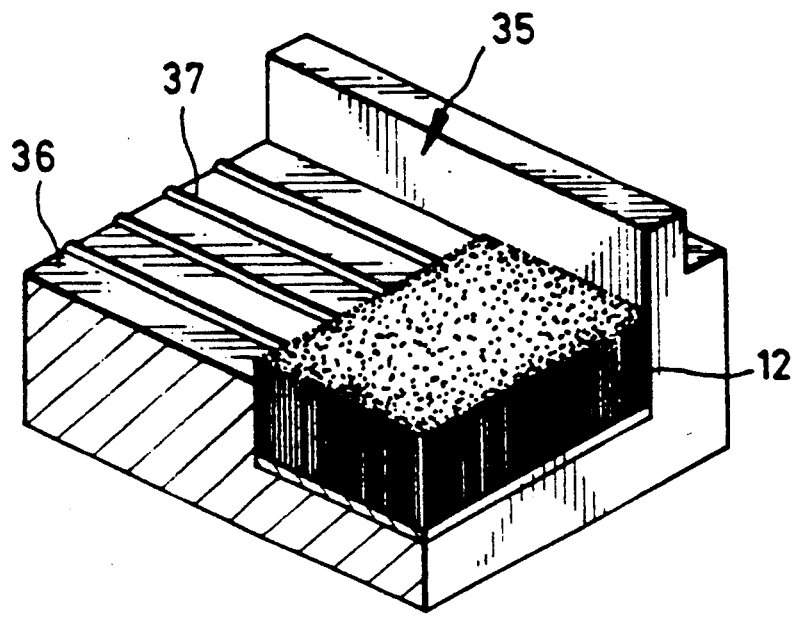
Figure 6:
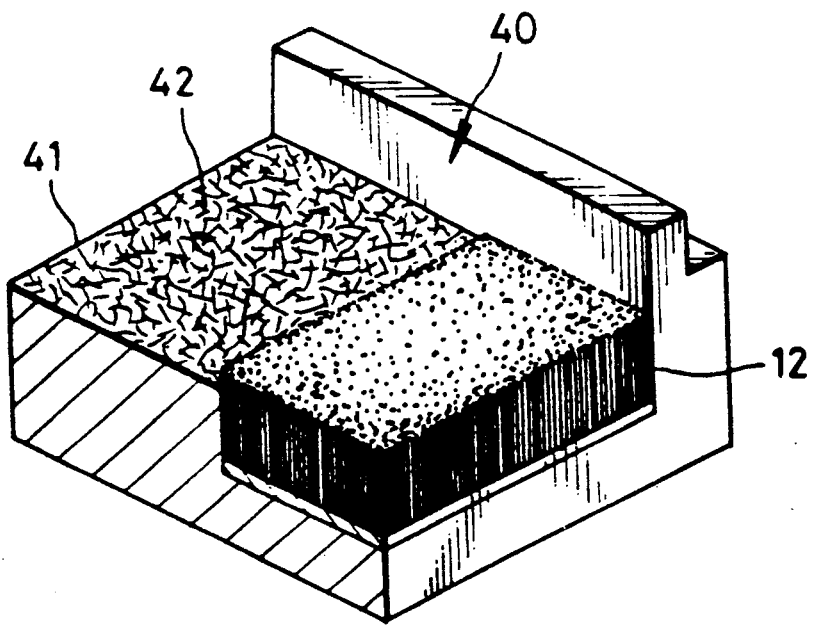

A film passageway 35 according to the third preferred embodiment and illustrated in FIG. 5, has inside surfaces 36, on which a great number of ridges 37, for trapping dust, run along the direction of the photographic film. A film passageway 40 of the fourth preferred embodiment and illustrated in FIG. 6, has inside surfaces 41, on which a granulation, or fine irregularity, 42 is formed, consisting of a great number of recesses and projections so as to trap dust.

Experiments were conducted as to occurrence of scratches on film surfaces: Sample 1 is the film cassette of the first embodiment above; Sample 2 is a film cassette in which only the grooves 15a are formed on the inside surfaces 7 and 8 of the film passageway 6a; Comparative example 1 is similar to Sample 1 but includes no such grooves at all; and Comparative example 2 is similar to Sample 2 but does not have grooves 15a, only grooves vertical to the former in the inside surfaces 7 and 8. The photographic film contained in the cassette shells was FUJI COLOR SUPER HG 400 (merchandise name; manufactured by Fuji Photo Film Co., Ltd.). Each strip of film has a length for 24 exposures. The photographic film was fully drawn out three times, and rewound each time. The photographic film was then developed and subjected to printing in the size of 89×127 mm ("service size") per frame. Lengths of visible scratches on photoprints as obtained were measured, and summed per strip of film. Measurement was conducted as to ten film cassettes for each of Samples 1 and 2 and Comparative examples 1 and 2, of which results are shown in Table 1 below:

TABLE 1

|  |  | Minimum | Maximum | Average |
|---|---|---|---|---|
| Summed Length of Scratches (in mm) | Sample 1 | 0 | 15 | 3 |
|  | Sample 2 | 1 | 22 | 5 |
|  | Comparative example 1 | 12.5 | 152 | 49.5 |
|  | Comparative | 3 | 85 | 23 |

TABLE 1-continued

| | Minimum | Maximum | Average |
|---|---|---|---|
| example 2 | | | |

It is apparent from the results of these experiments that the grooves extending in the direction of passing of the photographic film are highly effective. It is noted that equally beneficial results were obtained by conducting the same experiments with film cassettes having the ridges 37 or the granulation 42.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined in the appended claims, they should be construed as included therein.

What is claimed is:

1. A photographic film cassette comprising:
a spool core having a photographic film wound thereon in a roll;
a cassette shell rotatably containing said spool core in a film chamber defined by said cassette shell;
a film passageway formed on said cassette shell so as to allow said photographic film to pass to the outside of said cassette shell from said film chamber;
a direction device formed in said cassette shell so as to engage with said photographic film and direct said photographic film to said outside of said cassette shell through said film passageway in response to rotation of said spool core; and
a plurality of recesses formed on upper and lower inside surfaces of said film passageway so as to receive dust material existing on surfaces of said photographic film, and said plurality of recesses being formed so as to extend along a direction of travel of said photographic film.

2. A photographic film cassette as claimed in claim 1, wherein said cassette shell includes two molded shell halves.

3. A photographic film cassette as claimed in claim 2, wherein said plurality of recesses are defined between a plurality of ridges formed so as to extend along a direction of travel of said photographic film.

4. A photographic film cassette as claimed in claim 2, wherein said plurality of recesses are grooves formed, so as to define a grid, along said direction of travel of said photographic film and a direction perpendicular to said direction of travel.

5. A photographic film cassette as claimed in claim 2, wherein said plurality of recesses are grooves formed so as to extend along the direction of travel of said photographic film.

6. A photographic film cassette as claimed in claim 5, wherein said direction device includes a leader-separating tapered portion provided in a position between said film passageway and a film chamber so as to separate said film leader from said roll of film so as to guide said film leader to a film passage mouth, a length of said tapered portion substantially corresponding to a distance from an outer side of image frames on said photographic film to a lateral edge of said photographic film.

7. A photographic film cassette as claimed in claim 6, wherein said plurality of grooves further extend to the cylindrical surface of said film chamber in parallel with said direction of film travel.

8. A photographic film cassette as claimed in claim 7, wherein $D_1=0.1$ and $D_2=0.6$, where $D_1$ is a depth of said grooves in millimeters and $D_2$ is an interval between said grooves in millimeters.

9. A photographic film cassette as claimed in claim 7, further comprising:
two pairs of projections formed on said upper and lower inside surfaces at each end of said film passageway to project toward opposite said inside surfaces so as to define a narrowed interval across said film passageway; and
grooves formed on surfaces of said projections.

10. A photographic film cassette as claimed in claim 9, wherein said direction device further comprises:
a pair of circumferential lips, formed on inner walls of a pair of spool flanges provided on said spool core, so as to project toward said roll of film for contact with lateral edges of an outermost turn of said roll of film so as to prevent said roll of film from loosening; and
a film releasing device provided on an inside of said cassette shell positioned so as to partially press peripheral edges of said spool flanges apart from said roll of film so as to release said roll of film from contact with said circumferential lips at portions of said circumferential lips proximate said film releasing device.

11. A photographic film cassette as claimed in claim 10, wherein an external diameter of said circumferential lips is smaller than a diameter of said peripheral edges of said spool flanges; and said film releasing device is in partial contact with said peripheral edges of said spool flanges so as to press said spool flanges.

12. A photographic film cassette as defined in claim 11, wherein said spool flanges are rotatably fitted on said spool core.

13. A photographic film cassette as defined in claim 12, wherein said film releasing device is two guide projections of a triangular shape.

14. A photographic film cassette as defined in claim 13, wherein a pair of rings are fitted on said spool core outside said spool flanges for shielding light incident through bearing holes formed in said cassette shell for rotatably supporting said spool core.

15. A photographic film cassette as defined in claim 14, wherein a leading end of said film leader is cut at an angle to a transverse direction of a film so as to project a side of said film leader corresponding to said leader-separating tapered portion.

16. A photographic film cassette as defined in claim 15, wherein arcuate ridges are formed on lateral surfaces of said film chamber, in a position opposite said guide projections, so as to press said spool flanges against said roll of film.

17. A photographic film cassette in which a spool, having photographic film wound thereon, is rotatably contained in a cassette shell, and rotation of said spool propels a leader of said photographic film to the outside of said cassette shell through a film passage mouth, comprising:
a film passageway formed in said cassette shell so as to communicate with said film passage mouth; and
one of a plurality of grooves and projections formed on upper and lower inside surfaces of said film passageway and extending along a direction of travel of said photographic film.

* * * * *